US009436686B1

(12) United States Patent
Pasula et al.

(10) Patent No.: US 9,436,686 B1
(45) Date of Patent: Sep. 6, 2016

(54) CLAIM EVALUATION SYSTEM

(75) Inventors: Hanna Pasula, Zurich (CH); Thomas Bugnon, Zurich (CH); Yaniv Bernstein, Parkville (AU); Gheorghe Postelnicu, Zurich (CH)

(73) Assignee: GOOGLE INC., Mountain View, CA (US)

( * ) Notice: Subject to any disclaimer, the term of this patent is extended or adjusted under 35 U.S.C. 154(b) by 820 days.

(21) Appl. No.: 13/569,042

(22) Filed: Aug. 7, 2012

(51) Int. Cl.
G06F 17/30 (2006.01)
(52) U.S. Cl.
CPC ............................... *G06F 17/30026* (2013.01)
(58) Field of Classification Search
CPC .................. G06F 17/30398; G06F 17/30023; G06F 17/3005; G06F 17/30103; G06F 17/30122; G06F 17/30126; G06F 17/30277; G06F 17/30309; G06F 17/30389; G06F 17/30395; G06F 17/30522; G06F 17/30442; G06F 17/30424; G06F 17/30026
USPC ........................................................ 707/769
See application file for complete search history.

(56) References Cited

U.S. PATENT DOCUMENTS

| 8,924,269 | B2* | 12/2014 | Seubert et al. | 705/35 |
| 2002/0144154 | A1* | 10/2002 | Tomkow | 713/201 |
| 2002/0178029 | A1* | 11/2002 | Nutter et al. | 705/1 |
| 2006/0036603 | A1* | 2/2006 | Laney | 707/9 |
| 2006/0212376 | A1* | 9/2006 | Snyder et al. | 705/35 |
| 2007/0198323 | A1* | 8/2007 | Bourne et al. | 705/10 |
| 2008/0120129 | A1* | 5/2008 | Seubert et al. | 705/1 |
| 2011/0184776 | A1* | 7/2011 | Spradling et al. | 705/7.28 |
| 2012/0137367 | A1* | 5/2012 | Dupont et al. | 726/25 |

* cited by examiner

*Primary Examiner* — Hosain Alam
*Assistant Examiner* — Saba Ahmed
(74) *Attorney, Agent, or Firm* — Lowenstein Sandler LLP

(57) ABSTRACT

A system and method for evaluating claims is disclosed. The system comprises a selection module, a query module, a communication module and a determination module. The selection module determines a review set including one or more claims based at least in part on claim data. The query module determines, based at least in part on the review set, an evaluation form including one or more queries associated with a first claim. The communication module receives answer data describing one or more answers responsive to the one or more queries included in the evaluation form. The determination module determines a validity decision associated with the first claim based at least in part on the answer data.

20 Claims, 9 Drawing Sheets

Instructions:
- Please watch the two (silent) video clips below and compare them. (Note: differences of a second or less at the start or the end of clips are not important.)
- Decide whether the clips match: that is, whether they are based on the same underlying video footage, although this footage may be transformed in some way (e.g., cropping, stretching, mirroring, adding borders, different subtitles, different overlays, quality or color changes, etc.).
- If the footage does match throughout the clips, indicate so by choosing "Matching Footage."
- If you find that some, but not all, of the footage matches, please determine whether this partial match corresponds to any of the categories listed below.

A first video clip — 752    A second video clip — 754

Match Description (Compulsory):

- ◯ Matching Footage (Ignoring irrelevant transformations)
- ▽ Partially Matching Footage
    - ◯ Different footage from same video game
    - ◯ Different versions of the Intro/Credits for the same show
    - ◯ Different versions of a music video
    - ◯ Different versions of a movie preview
    - ◯ Different Google searches
    - ◯ Different versions of a personalizable video
    - ◯ Same speaker(s), different moment
    - ◯ Other form of partially matching footage
- ◯ No Matching Footage
- ◯ Not Sure
- ◯ Technical Problems

} 756

Comments (Optional):
— 758
— 760

[ Cancel ]    [ Submit ]

Figure 7B

CLAIM EVALUATION SYSTEM

BACKGROUND

The specification relates to a data management system. In particular, the specification relates to a system and method for evaluating a claim precision for a review set that includes one or more claims.

A user who uploads an intellectual property asset (e.g., a video file, an audio file, etc.) to an asset hosting site usually provides a claim describing an association between the asset and a reference file. For example, a user uploads a music video to the asset hosting site and claims that the music video includes an audio recording that is a live version of an audio reference file. If the user who uploads the asset to the asset hosting site does not provide any claim for the asset, the asset hosting site may automatically create a claim for the asset declaring that the asset is associated with a reference file. It is beneficial for the user and/or the asset hosting site to claim any association between the asset and any reference files so that the asset hosting site may accelerate monetizing the asset and share revenue from the monetization of the asset with the user. However, a claim may be incorrect if the user and/or the asset hosting site misinterpret the association between the asset and the reference file. The asset cannot be monetized if the claim associated with the asset is incorrect.

Thus, it is particularly desirable to establish a system that not only evaluates a validity of an individual claim, but also determines an overall accuracy of all the claims. However, existing systems fail to evaluate the accuracy of an individual claim and/or the accuracy of all the claims as a group. For example, existing systems fail to provide a mechanism to determine whether a claim is correct. Existing systems therefore fail to evaluate an overall accuracy of all the claims (e.g., a percentage of incorrect claims in all the claims).

SUMMARY OF THE INVENTION

The specification overcomes the deficiencies and limitations of the prior art at least in part by providing a system and method for evaluating a claim precision for a review set including one or more claims. The system comprises a selection module, a query module, a communication module and a determination module. The selection module determines the review set including one or more claims based at least in part on claim data. The query module determines, based at least in part on the review set, an evaluation form including one or more queries associated with a first claim. The communication module receives answer data describing one or more answers responsive to the one or more queries included in the evaluation form. The determination module determines a validity decision associated with the first claim based at least in part on the answer data.

BRIEF DESCRIPTION OF THE DRAWINGS

The specification is illustrated by way of example, and not by way of limitation in the figures of the accompanying drawings in which like reference numerals are used to refer to similar elements.

FIG. 7B is a graphical representation illustrating a user interface for providing an evaluation form according to another embodiment.

DETAILED DESCRIPTION OF THE PREFERRED EMBODIMENTS

Figure 1:
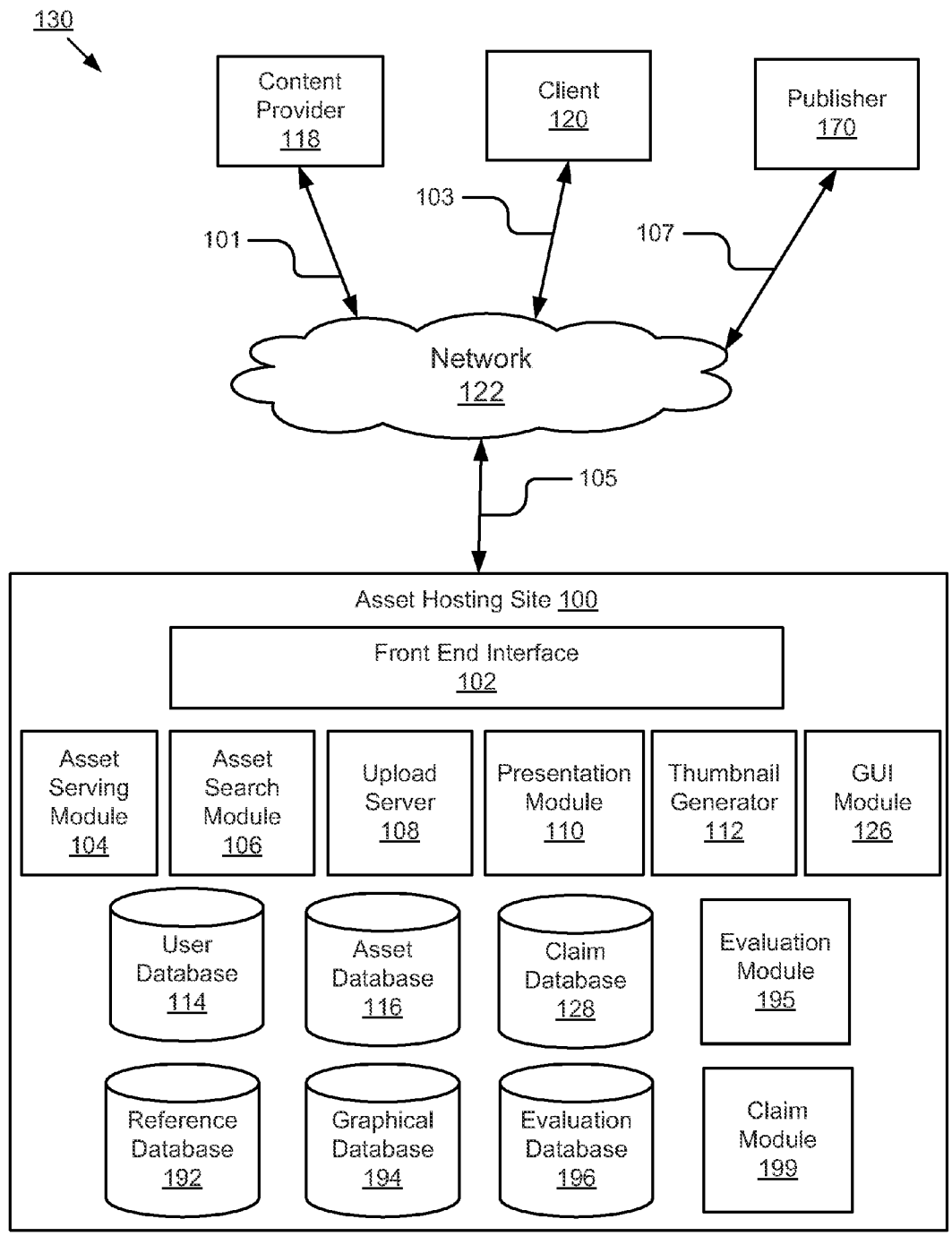
FIG. 1 is a high-level block diagram illustrating a system for evaluating a claim precision according to one embodiment.

A system and method for evaluating a claim precision is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code for deriving associations between assets will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 is a high-level block diagram illustrating a system 130 for evaluating a claim precision according to one embodiment. The illustrated embodiment of the system 130 includes an asset hosting site 100, a content provider 118, a client 120 and a publisher 170. These entities of the system 130 are communicatively coupled via a network 122. Although only one content provider 118, one client 120 and one publisher 170 are illustrated, one skilled in the art will recognize that any number of content providers 118, clients 120 and publishers 170 can be communicatively coupled to the network 122. Furthermore, while only one network 122 is coupled to the content provider 118, the client 120 and the publisher 170, one skilled in the art will appreciate that any number of networks 122 can be connected to these entities shown in FIG. 1.

The network 122 is a conventional type of network, wired or wireless, and may have any number of configurations such as a star configuration, token ring configuration or other configurations known to those skilled in the art. In one embodiment, the network 122 comprises one or more of a local area network (LAN), a wide area network (WAN) (e.g., the Internet), and/or any other interconnected data path across which multiple devices communicate. In another embodiment, the network 122 is a peer-to-peer network. The network 122 is coupled to or includes portions of a telecommunications network for sending data in a variety of different communication protocols. For example, the network 122 is a 3G network or a 4G network. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), etc. In yet another embodiment, all or some of the links in the network 122 are encrypted using conventional encryption technologies such as secure sockets layer (SSL), secure HTTP and/or virtual private networks (VPNs).

In the illustrated embodiment, the asset hosting site 100 is communicatively coupled to the network 122 via signal line 105. The content provider 118 is communicatively coupled to the network 122 via signal line 101. The client 120 is communicatively coupled to the network 122 via signal line 103. The publisher 170 is communicatively coupled to the network 122 via signal line 107.

The asset hosting site 100 is any system that allows a user to access an intellectual property asset via searching and/or browsing interfaces. An example of an asset hosting site 100 is the YOUTUBE™ website, found at www.youtube.com. Other asset hosting sites are known as well, and are adapted to operate according to the teachings disclosed herein. It will be understood that the term "website" represents any computer system adapted to serve content using any interact working protocols, and is not intended to be limited to content uploaded or downloaded via the Internet or the HTTP protocol.

In one embodiment, the asset hosting site 100 is configured to receive and share all or a portion of an intellectual property asset. Examples of an intellectual property asset include, but are not limited to a composition, an audio recording, a music video, etc. Those skilled in the art will recognize that an intellectual property asset can be represented in any media type and/or file type. For example, the asset hosting site 100 shares intellectual property assets such as a text file (e.g., one or more compositions of songs), an audio file (e.g., one or more audio recordings of songs), a video file and a file that includes a combination of video and audio (e.g., one or more videos such as music videos), etc. A file that includes a combination of video and audio is referred to as an "audio-video file" hereinafter. An intellectual property asset is referred to as "an asset" or "an asset file" hereinafter.

In one embodiment, sources of assets provided by the asset hosting site 100 are from uploads of assets by users (e.g., record labels, personal users, etc.), searches or crawls of other web sites or databases of assets, or the like, or any combination thereof. For example, in one embodiment, an asset hosting site 100 is configured to allow uploads of assets by users. In another embodiment, the asset hosting site 100 is configured to only obtain assets from other sources by crawling such sources or searching such sources in real time.

In the illustrated embodiment, the asset hosting site 100 includes: a front end interface 102; an asset serving module 104; an asset search module 106; an upload server 108; a presentation module 110; a thumbnail generator 112; a graphical user interface module 126 ("GUI module 126"); a user database 114; an asset database 116; a claim database 128; a reference database 192; a graphical database 194; an evaluation database 196; an evaluation module 195; and a claim module 199.

The components of the asset hosting site 100 are communicatively coupled to each other. For example, the components are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the asset hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by clients 120 or other entities in other embodiments if appropriate. In one embodiment, the functionality attributed to a particular component is performed by different or multiple components operating together.

In one embodiment, each of the various servers and modules is implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 118, the client 120 and the publisher 170 via the network 122. For example, the front end interface 102 receives an asset uploaded from the content provider 118 and delivers the asset to the upload server 108. In one embodiment, the front end interface 102 receives requests from users operating on the client devices 120 and delivers the requests to the other components of the asset hosting site 100 (e.g., the asset search module 106 or the asset serving module 104). For example, the asset is a video and the front end interface 102 receives a video search query from a user and sends the video search query to the asset search module 106.

The upload server 108 receives one or more assets from the content provider 118 via the front end interface 102. For example, the upload server 108 receives one or more of a text file, an audio-video file and an audio file from the content provider 118. In one embodiment, the upload server 108 processes the one or more assets and stores the processed assets in the asset database 116. The upload server 108 assigns an asset identifier ("asset ID") to the stored asset. For example, the upload server 108 assigns an identifier to a file for a music video ("music video ID") and stores the music video together with the music video ID in the asset database 116. In other embodiments, the upload server 108 performs one or more of: formatting an asset; compressing an asset; metadata tagging an asset; content analysis; and fingerprinting an asset, etc.

The asset database 116 is a storage system that stores assets shared by the asset hosting site 100 with the users. In one embodiment, the asset database 116 stores the assets processed by the upload server 108. In another embodiment, the asset database 116 also stores metadata associated with the assets. The metadata includes one or more of: a content type of the asset (e.g., an audio file, a video file, an audio-video file, etc.); an owner of the asset; a title; a description; tag information; a time length; and the like. In one embodiment, some or all of the metadata of the assets is provided by the content provider 118. For example, a user of the content provider 118 provides a title, a description and a content type of an asset when uploading the asset to the asset hosting site 100. In one embodiment, the assets stored on the asset database 116 are referred to as "asset files."

The asset search module 106 includes code and routines that, when executed by a processor (not pictured), processes any search queries received by the front end interface 102 from users. A search query received by the front end interface 102 from a user includes search criteria such as keywords that identify an asset the user is interested in. The asset search module 106 uses the search criteria to query the metadata of the asset stored in the asset database 116. The search results for the query are returned to the front end interface 102 for presentation to the user. For example, if a user provides the front end interface 102 with a keyword search query, the asset search module 106 identifies an asset stored in the asset database 116 related to the keyword and returns the search result (e.g., asset IDs and/or metadata such as titles, descriptions, thumbnails of the identified assets) to the front end interface 102.

The asset serving module 104 includes code and routines that, when executed by a processor (not pictured), processes requests for an asset (e.g., a composition, audio recording, music video, any other type of video, etc) and provides the asset to users. For example, the asset serving module 104 receives a query from a user via the front end interface 102, retrieves a set of music videos from the asset database 116 based at least in part on the query and presents the set of music videos to the user via the front end interface 102.

In one embodiment, the asset serving module 104 receives a request from a user to access an asset when the user clicks on a link to the asset. The request received from the user includes the asset ID of the asset that the user wishes to access. In one embodiment, the asset ID is included automatically in the request once the user clicks on the link for the asset. The asset serving module 104 uses the asset ID to search and locate the asset in the asset database 116. Once the requested asset is located, the asset serving module 104 transmits the asset to the user via the front end interface 102. The asset is presented to the user on a web page. Metadata associated with the asset is also presented with the asset, such as the title and description of the asset. In one embodiment, the asset serving module 104 stores the asset ID of the asset in the user database 114 after sending the asset to the user so that an asset access history of the user is stored in the user database 114.

The user database 114 is a storage system that stores data and/or information associated with a user. For example, the user database 114 stores the asset IDs of assets uploaded by a user to the asset hosting site 100 and the asset IDs of assets that the user has accessed from the asset database 116. In one embodiment, the user is identified by using a login name and password and/or by using the user's internet protocol ("IP") address.

The thumbnail generator 112 includes code and routines that generates a thumbnail for an asset. A thumbnail is a picture that represents an asset in the asset hosting site 100. For example, assume the asset is a video (e.g., a music video). The thumbnail generator 112 analyzes the video and selects a frame of the video as the thumbnail. In one embodiment, the thumbnail generator 112 provides one or more pictures for the video and the user uploading the video to the asset hosting site 100 selects one picture as the thumbnail.

The GUI module 126 includes code and routines that, when executed by a processor (not pictured), generates graphical data for providing a GUI used by a human user to input information to the system 130. For example, the GUI module 126 generates graphical data for providing a GUI to a publisher 170, allowing a human user operating on the publisher 170 to provide a reference file to the asset hosting site 100. The reference file is described below with reference to the reference database 192. In one embodiment, the GUI module 126 stores the generated graphical data in the graphical database 194.

In one embodiment, the GUI module 126 is configured to transmit the graphical data to the front end interface 102. The front end interface 102 communicates with the network 122 to transmit the graphical data to a processor-based computing device communicatively coupled to the network 122. For example, the front end interface 102 transmits the graphical data to one or more of the content provider 118, the client 120 and the publisher 170. The processor-based computing device receives the graphical data and generates a GUI displayed on a display device (e.g., a monitor) communicatively coupled to the processor-based computing device. The GUI is displayed on the display device and viewed by a human user operating on the processor-based computing device.

In one embodiment, the GUI module 126 receives an identifier of an evaluation form from the evaluation module 195 and retrieves graphical form data for the evaluation form from the graphical database 194 based at least in part on the identifier. The graphical form data is data for depicting an evaluation form. For example, the graphical form data includes data describing content of an evaluation form and a layout of the content. The evaluation form is described below with reference to the evaluation module 195. The GUI module 126 generates graphical data for providing a GUI depicting the evaluation form based at least in part on the graphical form data. The GUI module 126 sends the graphical data to an evaluation client 239, causing the evaluation client 239 to provide the GUI including the evaluation form to an evaluator 241. The evaluation client 239 and the evaluator 241 are described below with reference to FIG. 2.

In another embodiment, the GUI module 126 receives data describing a claim precision from the evaluation module 195 and generates graphical data for providing a GUI for notifying an administrator of the asset hosting site 100 of the claim precision. The claim precision is described below in more detail with reference to the evaluation module 195.

The graphical database 194 is a non-transitory computer-readable storage medium that stores graphical data used to provide one or more user interfaces. For example, the graphical database 194 stores graphical data generated by the GUI module 126. In one embodiment, the graphical database 194 stores graphical form data for generating one or more evaluation forms.

The reference database 192 is a non-transitory computer-readable storage medium that stores one or more reference files. A reference file is a file whose identity is known. For example, a reference file is a file that the asset hosting site 100 has a license for. In one embodiment, a reference file is one of a reference audio file, a reference video file, a reference audio-video file and a reference image file, etc. In one embodiment, the reference database 192 additionally stores fingerprint data associated with a reference file. The fingerprint data is data describing a signature of a file. For example, the fingerprint data includes data describing an audio signature for a reference audio file or an audio portion of a reference audio-video file.

The claim module 199 includes code and routines for populating the claim database 128. For example, the claim module 199 stores claim data describing one or more claims in the claim database 128. A claim is data describing an association between an asset and a reference file. For example, a claim includes data stating that an audio portion of an audio-video asset includes a portion of a reference audio file. In another example, a claim includes data describing that a video asset is the same as a reference video file.

In one embodiment, a claim includes data describing that the fingerprint data of an asset is matched to the fingerprint data of a reference file. For example, a claim includes data describing that an audio signature of an audio asset is matched to an audio signature of a reference audio file. In another embodiment, a claim includes an asset ID of an asset, an identifier of a reference file ("reference ID") and data describing an association between the asset and the reference file. A claim is correct (or, valid) if an association between an asset and a reference file described in the claim is true. A claim is incorrect (or, invalid) if an association between an asset and a reference file described in the claim is false.

In one embodiment, a claim is received from a user. For example, the claim module 199 receives claim data describing a claim from a user operating on a processor-based computing device (e.g., the content provider 118, the client 120, the publisher 170, etc.) via the front end interface 102 and stores the claim data in the claim database 128.

In another embodiment, a claim is generated by the claim module 199. For example, the claim module 199 receives an asset from a content provider 118 via the front end interface 102 and the upload server 108. In one embodiment, the claim module 199 retrieves the asset from the asset database 116. The claim module 199 generates fingerprint data for the asset and determines a reference file stored in the reference database 192 that matches to the asset based at least in part on the fingerprint data for the asset. For example, the claim module 199 determines a reference audio file for an audio asset that has the same audio signature as the audio asset. The claim module 199 creates an association between the asset and the reference file and generates a claim including the association. The claim module 199 stores claim data describing the generated claim in the claim database 128.

In one embodiment, the claim module 199 receives one or more reference files from a publisher 170 via the front end interface 102 and generates fingerprint data for the one or more reference files. The claim module 199 stores the reference files and the fingerprint data in the reference database 192.

The claim database 128 is a non-transitory computer-readable storage medium that stores claim data describing one or more claims. In one embodiment, the claim database 128 stores claim data describing one or more claims provided by one or more users operating on one or more processor-based computing devices such as a content provider 118, a client 120 and a publisher 170. In another embodiment, the claim database 128 stores claim data describing one or more claims generated by the claim module 199 as described above.

The evaluation module 195 includes code and routines for evaluating one or more claims. In one embodiment, the evaluation module 195 retrieves claim data from the claim database 128 and determines a review set including one or more claims from the claim data. A review set is a set of claims for review. For example, a review set includes one or more claims to be processed by the evaluation module 195. In one embodiment, each claim in the review set indicates an association between an asset file and a reference file. In one embodiment, the evaluation module 195 determines the review set based at least in part on claim data describing the one or more claims.

Figure 7A:
FIG. 7A is a graphical representation illustrating a user interface for providing an evaluation form according to one embodiment.

For each claim included in the review set, the evaluation module 195 determines an evaluation form for the claim and sends an identifier of the evaluation form to the GUI module 126, causing the GUI module 126 to generate graphical data for providing a GUI depicting the evaluation form to one or more evaluators 241. The evaluation form is a form for evaluating a claim. For example, an evaluation form is a form including one or more queries for categorizing a relationship between an asset and a reference file. Examples of a GUI depicting an evaluation form are illustrated in FIGS. 7A and 7B.

The evaluation module 195 receives one or more sets of answer data from one or more evaluators 241. A set of answer data includes one or more answers responsive to the one or more queries included in the evaluation form from an evaluator 241. The evaluation module 195 processes the one or more sets of answer data and determines a validity decision for the claim based at least in part on the one or more sets of answer data. A validity decision is a decision describing whether a claim is correct. For example, a validity decision having a value of "1" indicates that a claim is correct. Alternatively, a validity decision having a value of "0" indicates that a claim is incorrect.

Similarly, the evaluation module 195 generates a validity decision for each claim included in the review set so that one or more validity decisions are generated for the one or more claims included in the review set. The evaluation module 195 determines a claim precision for the review set based at least in part on the one or more validity decisions. A claim precision is data describing a percentage of incorrect claims in a review set. For example, a claim precision with a value of 10% indicates that 10% of the claims in the review set are incorrect. A first claim precision having a smaller value than a second claim precision indicates that claims in a first review set associated with the first claim precision are more accurate than claims in a second review set associated with the second claim precision.

In one embodiment, the evaluation module 195 provides some or all of the functionality described below with reference to FIG. 2 and FIGS. 4-6. The evaluation module 195 is described below in more detail with reference to FIG. 2 and FIGS. 4-6.

The evaluation database 196 is a non-transitory computer-readable storage medium that stores data for claim evaluation. In one embodiment, the evaluation database 196 stores answer data received from one or more evaluators 241 and evaluation result data describing one or more validity decisions for one or more claims and/or one or more claim precisions for one or more review sets. One skilled in the art will recognize that the evaluation database 196 may store any other data for providing the functionality described herein. The evaluation database 196 is described below in more detail with reference to FIG. 3.

The content provider 118 is any device that provides assets to the asset hosting site 100. For example, the content provider 118 is a computing device that uploads an asset to the asset hosting site 100. In one embodiment, the content provider 118 is also one of a music label, an author, an artist or any entity having rights to upload an asset and/or a reference file to the asset hosting site 100.

In one embodiment, the content provider 118 is configured to operate a computing device to perform various content provider functions. Examples of the content provider functions include, but are not limited to: uploading an asset to the asset hosting site 100; editing an asset stored by the asset hosting site 100; removing an asset from the asset hosting site 100; editing content provider preferences associated with an asset; and providing a claim describing an association between a reference file and an asset, etc.

The client 120 is any processor-based computing device. The client 120 executes client software such as a web browser or built-in client application and connects to the asset hosting site 100 via the network 122. In one embodiment, the client 120 includes a variety of different computing devices. Examples of a client device 120 include, but are not limited to: a personal computer; a personal digital assistant; a television set-up box; a tablet computer; a cell phone (e.g., a smart phone); and a laptop computer. The client 120 comprises a processor (not pictured), a memory (not pictured) and other components conventional to a computing device.

In one embodiment, the client 120 is configured as a content provider 118 to provide assets to the asset hosting site 100. In another embodiment, the client 120 is configured as a publisher 170. In yet another embodiment, the client 120 is configured to retrieve assets stored by the asset hosting site 100. For example, the client 120 includes an embedded video player (e.g., the Flash™ player from Adobe Systems, Inc.) adapted for the video content formats used in the asset hosting site 100 so that a user is able to view a video from the asset hosting site 100 using the embedded video player. In yet another embodiment, the client 120 is operated by a human user for providing one or more claims to the asset hosting site 100.

The publisher 170 is any entity that publishes an asset. In one embodiment, the publisher 170 is any processor-based computing device that publishes an asset on a website, an application store, etc. In another embodiment, the publisher 170 refers to a human user that operates the computing device to publish the asset without causing any confusion.

In one embodiment, the publisher 170 owns one or more rights for an asset in a specified territory and is able to issue a license for the right in the territory. A right for an asset includes one of a public performance right, a reproduction right, a distribution right, a synchronization right and a right to make a derivative work, etc. In another embodiment, the publisher 170 provides one or more reference files for which the publisher 170 owns one or more rights to the claim module 199, causing the claim module 199 to store the reference files in the reference database 192. In yet another embodiment, the publisher 170 provides claim data describing one or more claims to the claim module 199, causing the claim module 199 to store the claim data in the claim database 128.

The system 130 provides a general framework for evaluating one or more claims submitted by one or more users and/or generated by the claim module 199. The system 130 is particularly advantageous because, for example, it not only evaluates the validity for each individual claim included in a review set, but also generates a claim precision for evaluating an overall accuracy of all the claims in the review set. Furthermore, the system 130 is able to evaluate a variety of claims associated with various content types such as video files, audio files, image files and any combination thereof. The system 130 determines a customized evaluation form for each content type as described below with reference to FIG. 2 so that ambiguities are minimized when categorizing an association between an asset and a reference file using the evaluation form.

Evaluation Module

Figure 2:
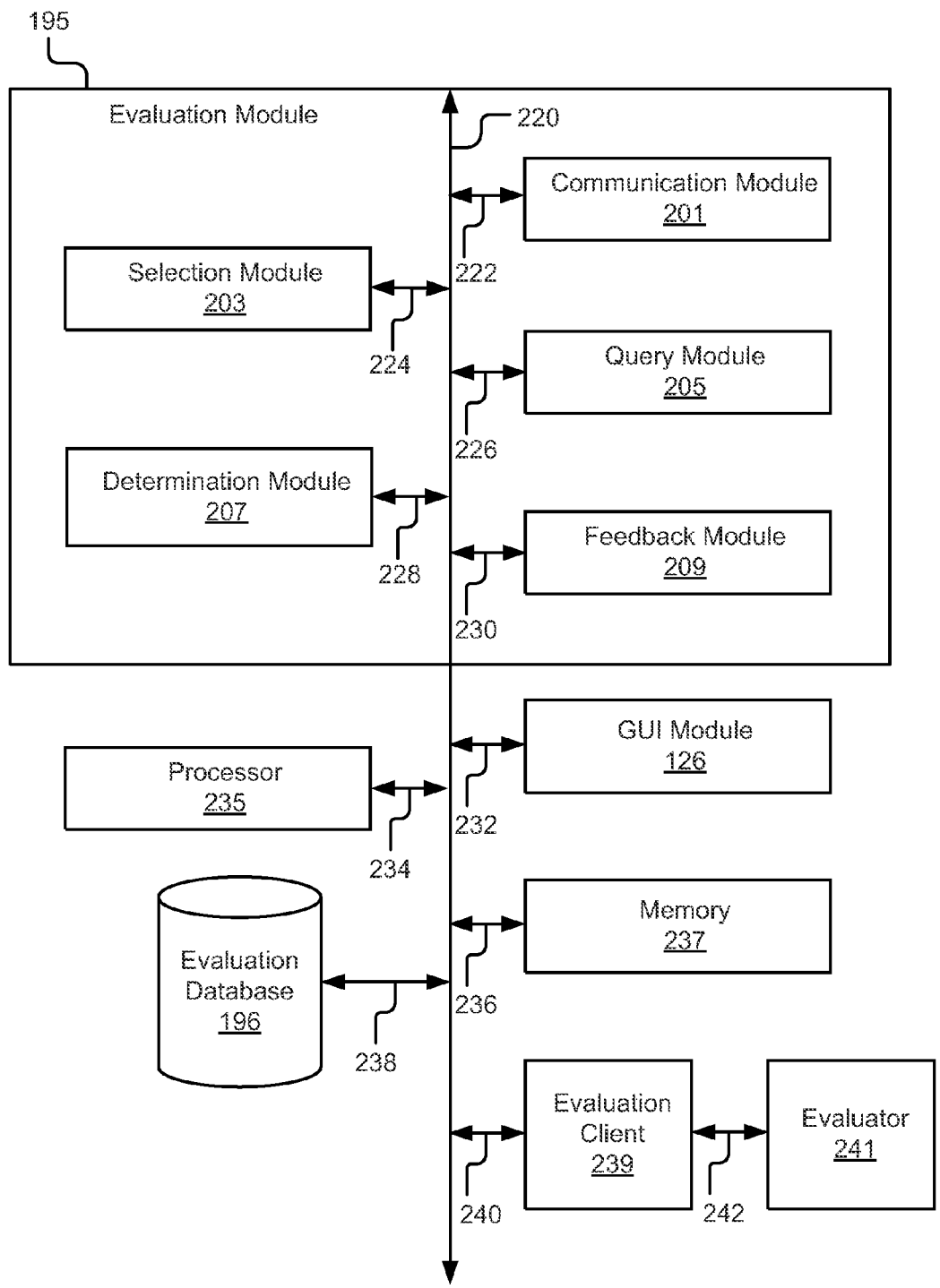
FIG. 2 is a block diagram illustrating an evaluation module according to one embodiment.

Referring now to FIG. 2, the evaluation module 195 is shown in more detail. FIG. 2 is a block diagram illustrating the evaluation module 195 according to one embodiment. FIG. 2 depicts the evaluation module 195, a processor 235, a memory 237, a GUI module 126, an evaluation database 196, an evaluation client 239 and an evaluator 241. These entities are communicatively coupled to a bus 220 for communication with each other. The evaluation database 196 is communicatively coupled to the bus 220 via signal line 238. The GUI module 126 is communicatively coupled to the bus 220 via signal line 232. Although only one evaluation client 239 and one evaluator 241 are depicted in FIG. 2, one skilled in the art will recognize that any number of evaluation clients 239 and evaluators 241 may be included in FIG. 2.

The processor 235 comprises an arithmetic logic unit, a microprocessor, a general purpose controller or some other processor array to perform computations, retrieve data stored on the memory 237, etc. The processor 235 is coupled to the bus 220 for communication with the other components. Processor 235 processes data signals and may comprise various computing architectures including a complex instruction set computer (CISC) architecture, a reduced instruction computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 234.

The memory 237 stores instructions and/or data that are executed by the processor 235. The memory 237 is communicatively coupled by the bus 220 for communication with the other components of the evaluation module 195. In one embodiment, the instructions and/or data comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The memory 237 is communicatively coupled to the bus 220 via signal line 236.

The evaluation client 239 is any device for presenting an evaluation form to a user. For example, the evaluation client 239 is any processor-based computing device such as a personal computer, a laptop computer, a smart phone, etc. The evaluation client 239 is communicatively coupled to the bus 220 via signal line 240. One skilled in the art will recognize that in one embodiment the evaluation client 239 may be coupled to a network 122 and communicate with components of the evaluation module 195 via the network 122 and the front end interface 102. In one embodiment, the evaluation client 239 is one of a content provider 118, a client 120 and a publisher 170.

In one embodiment, the evaluation client 239 receives graphical data from the GUI module 126 and presents a GUI depicting an evaluation form to the evaluator 241 on a display device (not pictured) coupled to the evaluation client 239. The evaluation client 239 receives answer data responsive to one or more queries in the evaluation form from the evaluator 241 and sends the answer data to the query module 205. In one embodiment, the answer data includes keyed text inputted by the evaluator 241. The keyed text is additional data provided by the evaluator 241. For example, the keyed text includes one or more comments from the evaluator 241. In one embodiment, the evaluation client 239 includes code and routines for automatically providing one or more answers to one or more queries in an evaluation form.

The evaluator 241 is a human user that interacts with the evaluation client 239. In one embodiment, the evaluator 241 reviews an evaluation form presented by the evaluation client 239 and provides one or more answers to one or more queries in the evaluation form. In another embodiment, the evaluator 241 additionally provides keyed text via one or more fields included in the evaluation form and sends the keyed text as a portion of the answer data to the evaluation module 195. The evaluator 241 interacts with the evaluation client 239 via signal line 242. In one embodiment the evaluator 241 is processor-executable computer code stored on a tangible computer-readable storage medium. In another embodiment, there is a group of two or more evaluators 241, and the group includes one or more human evaluators 241 and one or more evaluators 241 that are processor-executable computer code stored on a tangible computer-readable storage medium.

The evaluation module 195 comprises a communication module 201, a selection module 203, a query module 205, a determination module 207 and a feedback module 209. The components of the evaluation module 195 are communicatively coupled to each other via the bus 220. In one embodiment, the evaluation module 195 is implemented using hardware such as field-programmable gate arrays ("FPGAs") or application-specific integrated circuits ("ASICs"). One skilled in the art will recognize that the evaluation module 195 may include different modules and/or components to provide the functionality described herein.

The communication module 201 includes code and routines that, when executed by the processor 235, handles communication between components of the evaluation module 195 and other components of the asset hosting site 100. The communication module 201 also handles communication between the selection module 203, the query module 205, the determination module 207 and the feedback module 209. In the depicted embodiment, the communication module 201 is communicatively coupled to the bus 220 via signal line 222.

In one embodiment, the communication module 201 retrieves claim data from the claim database 128 and sends the claim data to the selection module 203. In another embodiment, the communication module 201 receives answer data from the evaluation client 239 and sends the answer data to one or more of the query module 205 and the feedback module 209. The communication module 201 stores the answer data in the evaluation database 196. In yet another embodiment, the communication module 201 receives a validity decision for a claim from the determination module 207 and stores the validity decision in the evaluation database 196. In yet another embodiment, the communication module 201 receives a claim precision for a review set from the determination module 207 and sends the claim precision to the GUI module 126. The communication module 201 stores the claim precision in the evaluation database 196.

The selection module 203 includes code and routines that, when executed by the processor 235, determines a review set. For example, the selection module 203 retrieves claim data describing a plurality of claims from the claim database 128 via the communication module 201 and determines a review set including one or more claims from the plurality of claims. The selection module 203 sends the review set to one or more of the query module 205 and the determination module 207. The selection module 203 is communicatively coupled to the bus 220 via signal line 224.

In one embodiment, the plurality of claims from which the review set is selected includes claims received from users in a predetermined period of time. For example, the plurality of claims includes claims received from users since a last claim precision was generated by the determination module 207. In another embodiment, the plurality of claims includes claims generated by the claim module 199 in a predetermined period of time. In yet another embodiment, the plurality of claims includes claims received from users and claims generated by the claim module 199 in a predetermined period of time. A predetermined period of time is a period of time such as a specified month, a specified week or a specified day, etc. In one embodiment, the predetermined period of time is configured by an administrator of the asset hosting site 100.

In one embodiment, the selection module 203 randomly selects one or more claims from the plurality of claims and forms a review set including the one or more selected claims. In another embodiment, the selection module 203 selects one or more specified claims from the plurality of claims and forms a review set including the one or more specified claims. A specified claim is a claim, for example, determined by an administrator of the asset hosting site 100. For example, the selection module 203 selects every tenth claim in the plurality of claims and forms a review set including every tenth claim in the plurality of claims. In yet another embodiment, the selection module 203 selects all the claims in the plurality of claims and forms a review set including all the claims in the plurality of claims.

The query module 205 includes code and routines that, when executed by the processor 235, sends queries to an evaluator 241 using an evaluation form. For example, the query module 205 receives a review set including one or more claims from the selection module 203 and determines an evaluation form for each claim included in the review set as described below. The evaluation form includes one or more queries about the claim and is presented to an evaluator 241 interacting with an evaluation client 239. The query module 205 receives answer data describing one or more answers responsive to the one or more queries from the evaluator 241. The query module 205 is communicatively coupled to the bus 220 via signal line 226.

For each claim included in the review set, the query module 205 parses the claim and determines an asset and a reference file associated with the claim. For example, the query module 205 parses the claim and extracts an asset ID for the asset and a reference ID for the reference file from the claim. The query module 205 determines a content type for the asset associated with the claim. A content type of an asset is one of an audio file, a video file, an audio-video file, an image file and any combination thereof. One skilled in the art will recognize that other content types are possible. In one embodiment, the query module 205 retrieves the asset from the asset database 116 based at least in part on the asset ID and determines a content type for the asset. For example, the query module 205 retrieves the asset from the asset database 116 using the asset ID and determines that the asset is an audio file. In another embodiment, the query module 205 retrieves metadata of the asset from the asset database 116 and determines a content type for the asset based at least in part on the metadata. For example, the query module 205 parses the retrieved metadata and extracts a content type for the asset from the metadata.

The query module 205 determines an evaluation form for the claim based at least in part on the content type of the asset. For example, the query module 205 determines that the content type is an audio file and selects an evaluation form that is customized for evaluating an audio file. An example of an evaluation form for evaluating an audio file is illustrated in FIG. 7A. The query module 205 sends an identifier of the determined evaluation form to the GUI module 126. The GUI module 126 retrieves graphical form data from the graphical database 194 based at least in part on the identifier of the evaluation form and generates graphical data for providing a GUI depicting the evaluation form. The GUI module 126 sends the graphical data to one or more evaluation clients 239, causing the one or more evaluation clients 239 to present the evaluation form to one or more evaluators 241 respectively.

In one embodiment, an evaluation form includes a link to an asset, a link to a reference file and one or more queries for categorizing an association between the asset and the reference file. In another embodiment, an evaluation form is tailored for a specific content type of an asset so that no ambiguity is incurred for the categorization of the association between the asset and the reference file. For example, a first evaluation form is customized for an audio asset as illustrated in FIG. 7A, while a second evaluation form is customized for a video asset as illustrated in FIG. 7B. In yet another embodiment, an evaluation form is organized as a questionnaire that includes a sequence of yes/no questions leading to an association between an asset and a reference file.

In one embodiment, the review set includes one or more claims. Each claim indicates an association between an asset file and a reference file. The query module 205 determines, based at least in part on the review set, an evaluation form including one or more queries associated with a first claim of the one or more claims. The first claim indicates a first association between a first asset file and a first reference file. In one embodiment, the first association indicates that the first asset file includes at least a portion of the first reference file. For example, the first asset file is a video and the first reference file is a song, and the first association indicates that the video includes at least part of the song in the video. The queries included in the evaluation form are configured by the query module 205 to determine whether the first association is accurate.

In one embodiment, the query module 205 receives one or more sets of answer data from one or more evaluators 241 that the evaluation form is presented to. Each set of answer data describes one or more answers to the one or more queries about the claim from one of the one or more evaluators 241. For example, the query module 205 receives a first set of answer data from a first evaluator 241 via an evaluation form presented to the first evaluator 241 and a second set of answer data from a second evaluator 241 via the same evaluation form presented to the second evaluator 241. In one embodiment, the query module 205 stores the one or more sets of answer data for the claim in the evaluation database 196. In another embodiment, the query module 205 sends the one or more sets of answer data for the claim to the determination module 207.

By performing similar procedures as described above, the query module 205 determines an evaluation form for each claim included in the review set. The query module 205 receives one or more sets of answer data for each claim from one or more evaluators 241. For example, assume that the review set includes two claims. The query module 205 determines a first evaluation form for a first claim and instructs the GUI module 126 to present the first evaluation form to one or more evaluators 241. The query module 205 receives one or more sets of answer data for the first claim from the one or more evaluators 241. Similarly, the query module 205 determines a second evaluation form for a second claim and receives one or more sets of answer data for the second claim from the one or more evaluators 241.

The determination module 207 includes code and routines that, when executed by the processor 235, determines a claim precision for a review set. The determination module 207 is communicatively coupled to the bus 220 via signal line 228. In one embodiment, the determination module 207 receives one or more sets of answer data for each claim in the review set from the query module 205. In another embodiment, the determination module 207 retrieves the one or more sets of answer data for each claim in the review set from the evaluation database 196.

For each claim in the review set, the determination module 207 parses the one or more sets of answer data associated with the claim and determines a validity decision for the claim based at least in part on the one or more sets of answer data. For example, the determination module 207 processes the one or more sets of answer data using a classification method and generates a validity decision for the claim as described below.

Examples of a classification method include, but are not limited to, a majority decision method (e.g., a method that makes a decision based on a majority of votes), a clustering method (e.g., a method that assigns a set of data into one or more clusters), a method using neuronal networks, a support vector machine (e.g., a supervised learning method that analyzes data and recognizes patterns for data classification) and principal component analysis (PCA) (e.g., a procedure that orthogonally transforms a set of correlated variables into a set of uncorrelated variables), etc. It is advantageous for the determination module 207 to determine a validity decision for a claim using a variety of classification methods because, for example, the determination module 207 may apply different classification methods under different circumstances so that the performance of the determination module 207 can be optimized. In one embodiment, the determination module 207 is unable to make a determination and sends the claim to a human user for further review.

In one embodiment, the determination module 207 applies a classification method (e.g., a majority decision method) and determines an association between the asset and the reference file based at least in part on the one or more sets of answer data associated with the claim. An association between an asset and a reference file determined based at least part on the answer data is referred to as "a determined association." For example, assume that the determination module 207 receives three sets of answer data associated with a claim from three evaluators 241. Both a first set of answer data from a first evaluator 241 and a second set of answer data from a second evaluator 241 describe that an audio asset has the same recording as an audio reference file. However, a third set of answer data from a third evaluator 241 describes that the audio asset is a remix version of the audio reference file. Based on the majority decision method, the determination module 207 determines an association between the audio asset and the audio reference file as "the audio asset has the same recording as the audio reference file" because, for example, this determined association is supported by a majority of the evaluators 241 (e.g., more than 50% of the evaluators 241).

The determination module 207 compares the determined association to an association described by the claim and determines whether the claim is correct. An association described by a claim is referred to as "a claimed association." In one embodiment, the determination module 207 determines that the claim is correct if the claimed association is matched to the determined association. For example, if both the claimed association and the determined association describe that "an audio asset has the same recording as an audio reference file," the determination module 207 determines that the claim is correct. The determination module 207 generates a validity decision for the claim having a value of "1." Alternatively, the determination module 207 determines that the claim is incorrect if the claimed association is not matched to the determined association. For example, if the claimed association describes that "the audio asset is a live version of the audio reference file" while the determined association describes that "the audio asset has the same recording as the audio reference file," the determination module 207 determines that the claim is incorrect. The determination module 207 generates a validity decision for the claim having a value of "0."

The determination module 207 determines a validity decision for each claim included in the review set by performing similar procedures as described above so that one or more validity decisions are generated for the one or more claims included in the review set. The determination module 207 determines a claim precision for the review set based at least in part on the one or more validity decisions. For example, assume that the review set includes five claims. The determination module 207 generates four validity decisions each having a value of "1" for four of the five claims (e.g., four claims are correct) and a validity decision having a value of "0" for one of the five claims (e.g., one claim is incorrect). The determination module 207 determines that the claim precision for the review set is 80% (e.g., ⅘=0.80).

In one embodiment, the determination module 207 stores the claim precision for the review set in the evaluation database 196. In another embodiment, the determination module 207 sends the claim precision to the GUI module 126, causing the GUI module 126 to generate graphical data for providing a GUI for depicting the claim precision to a user.

In one embodiment, the review set includes one or more claims. Each claim indicates an association between an asset file and a reference file. The query module 205 determines, based at least in part on the review set, an evaluation form including one or more queries associated with a first claim of the one or more claims. The first claim indicates a first association between a first asset file and a first reference file. In one embodiment, the first association indicates that the first asset file includes at least a portion of the first reference file. For example, the first asset file is a video and the first reference file is a song, and the first association indicates that the video includes at least part of the song in the video. The queries included in the evaluation form are configured by the query module 205 to determine whether the first association is accurate. The communication module 201 receives answer data describing one or more answers responsive to the one or more queries included in the evaluation form. The determination module 207 determines a validity decision associated with the first claim. In one embodiment, the determination module 207 determines the validity decision based at least in part on the answer data. In one embodiment, the validity decision indicates whether the first association is accurate. For example, the validity decision indicates whether the first asset file includes at least a portion of the first reference file.

The feedback module 209 includes code and routines that, when executed by the processor 235, provides feedback data for an evaluation form. The feedback module 209 is communicatively coupled to the bus 220 via signal line 230. In one embodiment, the feedback module 209 receives answer data from an evaluator 241 via the communication module 201. The feedback module 209 parses the answer data and determines whether the answer data includes keyed text data provided by the evaluator 241. If the answer data includes keyed text data, the feedback module 209 sends the keyed text data to an administrator of the system 130 as feedback data. In one embodiment, the feedback module 209 updates an evaluation form for a specific content type based at least in part on the feedback data. For example, the feedback module 209 retrieves the graphical form data for depicting an evaluation form from the graphical database 194 and updates the graphical form data based at least in part on the feedback data. The feedback module 209 stores the updated graphical form data in the graphical database 194.

Evaluation Database

Figure 3:
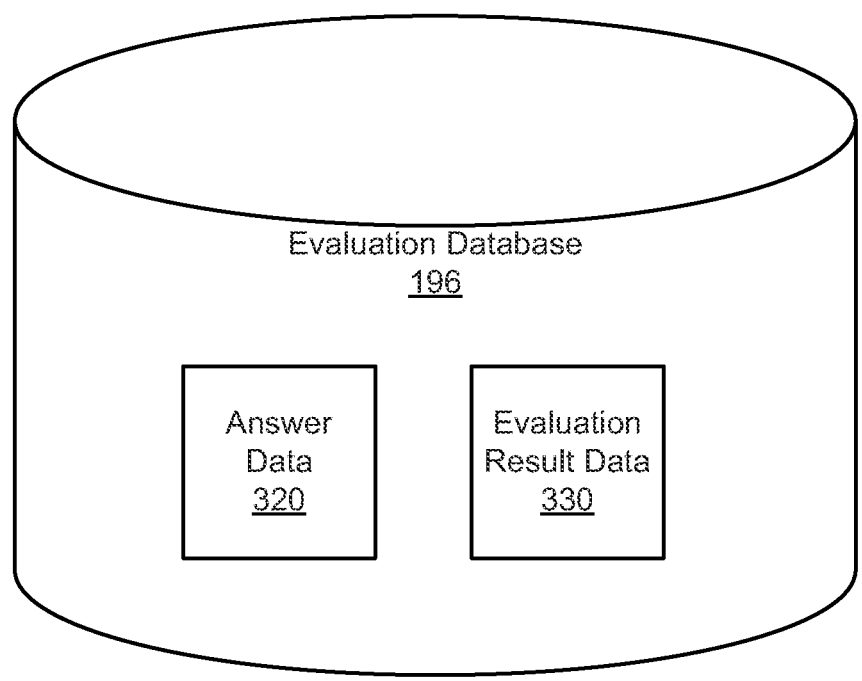
FIG. 3 is a block diagram illustrating an evaluation according to one embodiment.

Referring now to FIG. 3, the evaluation database 196 is shown in more detail. FIG. 3 is a block diagram illustrating the evaluation database 196 according to one embodiment. The evaluation database 196 includes answer data 320 and evaluation result data 330.

The answer data 320 includes data describing one or more answers responsive to one or more queries included in an evaluation form. In one embodiment, the answer data 320 includes one or more sets of answer data for a claim received from one or more evaluators 241 that an evaluation form is presented to. In another embodiment, the answer data 320 additionally includes keyed text received from one or more evaluators 241.

The evaluation result data 330 includes data generated by the evaluation module 195. For example, the evaluation result data 330 includes a validity decision for each claim included in a review set. In one embodiment, the evaluation result data 330 includes a claim precision for a review set. In another embodiment, the evaluation result data 330 additionally includes identifiers for claims included in a review set.

Methods

Figure 4:
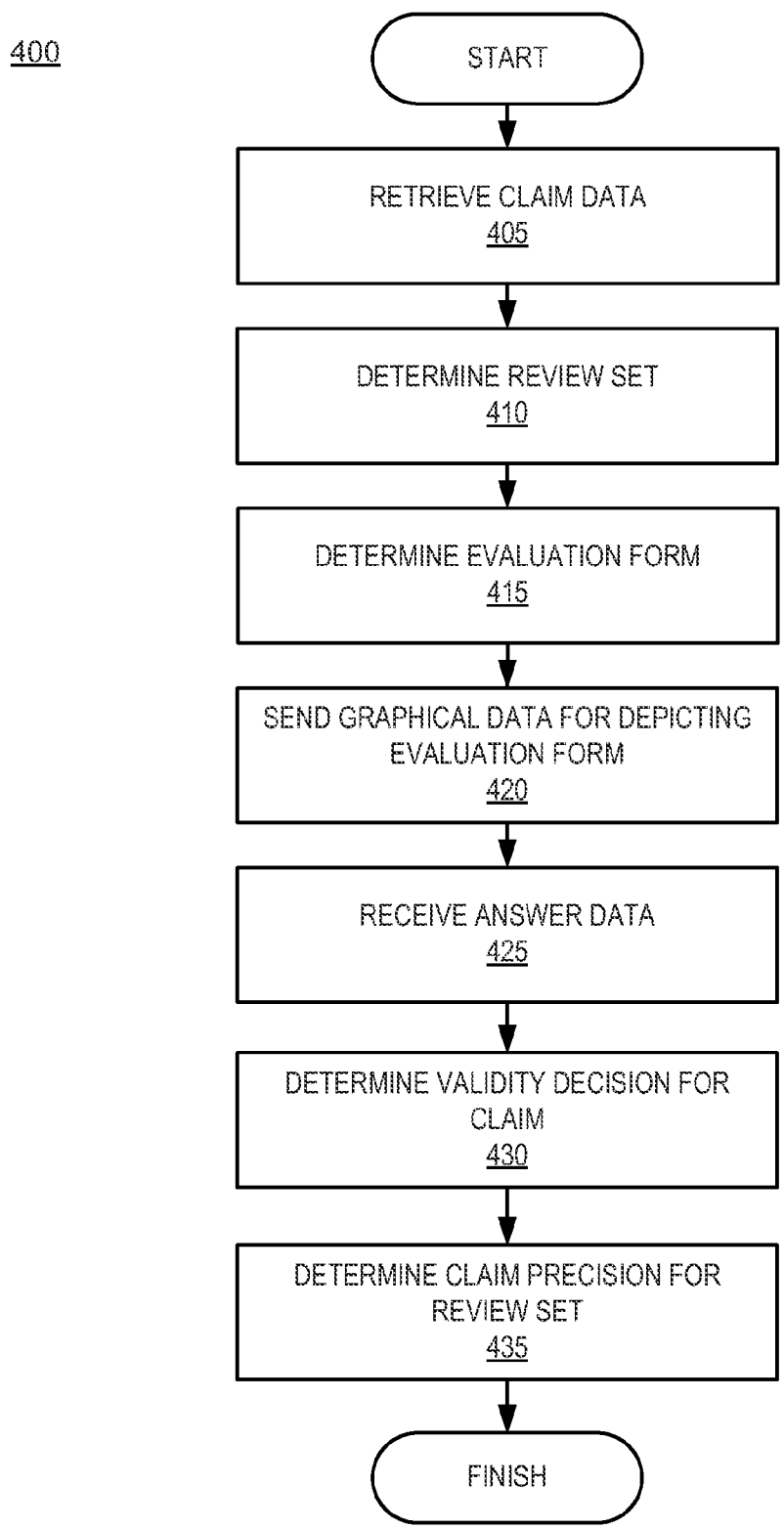
FIG. 4 is a flow diagram illustrating a method for evaluating a claim precision according to one embodiment.
Figure 5A:
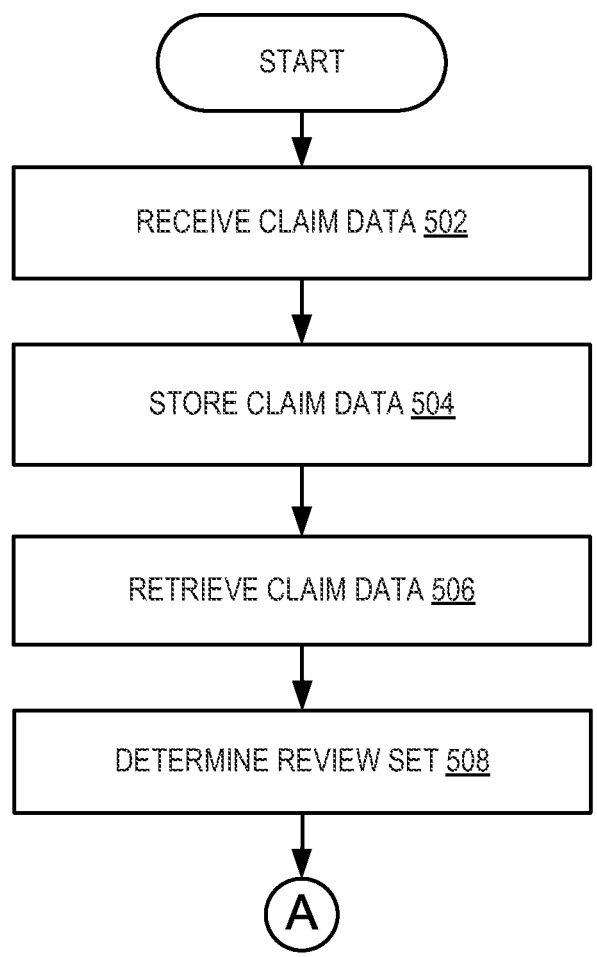
FIGS. 5A and 5B are flow diagrams illustrating a method for evaluating a claim precision according to another embodiment.
Figure 5B:
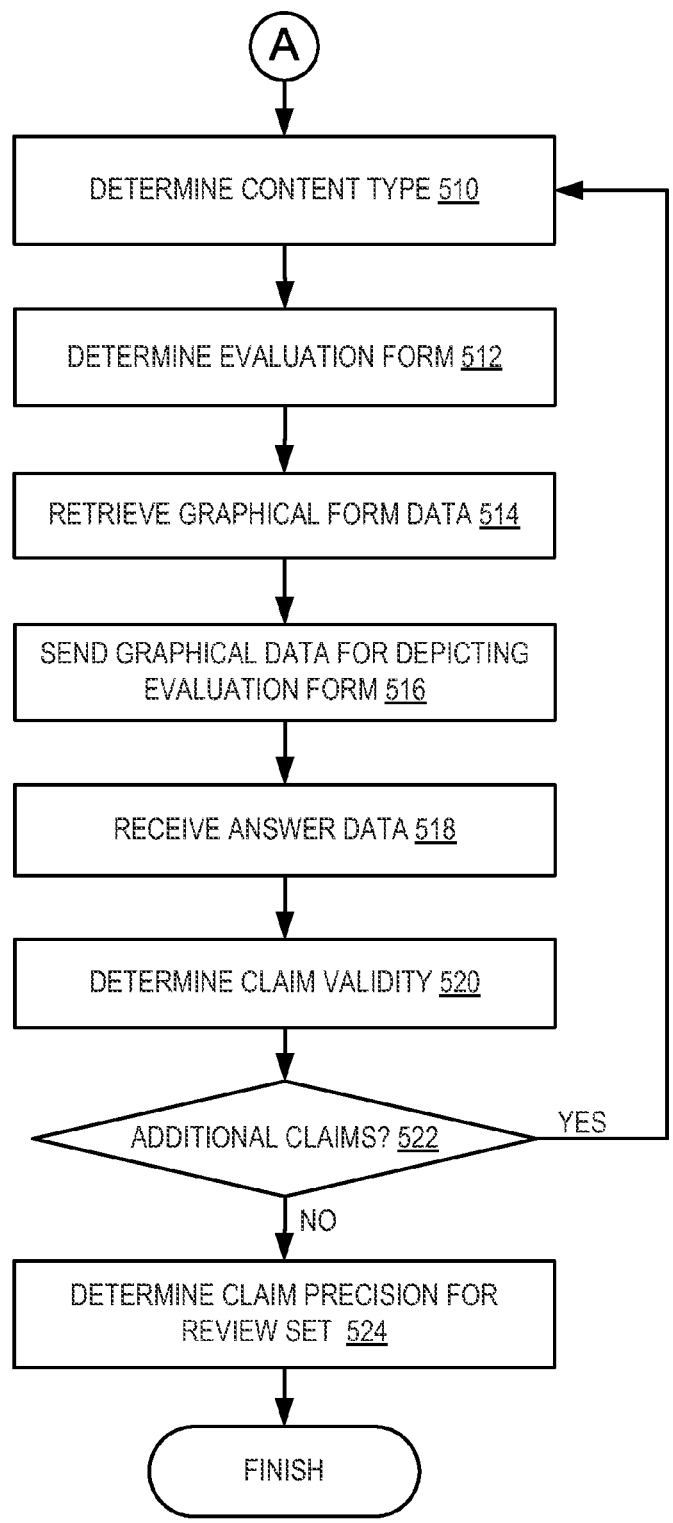
Figure 6:
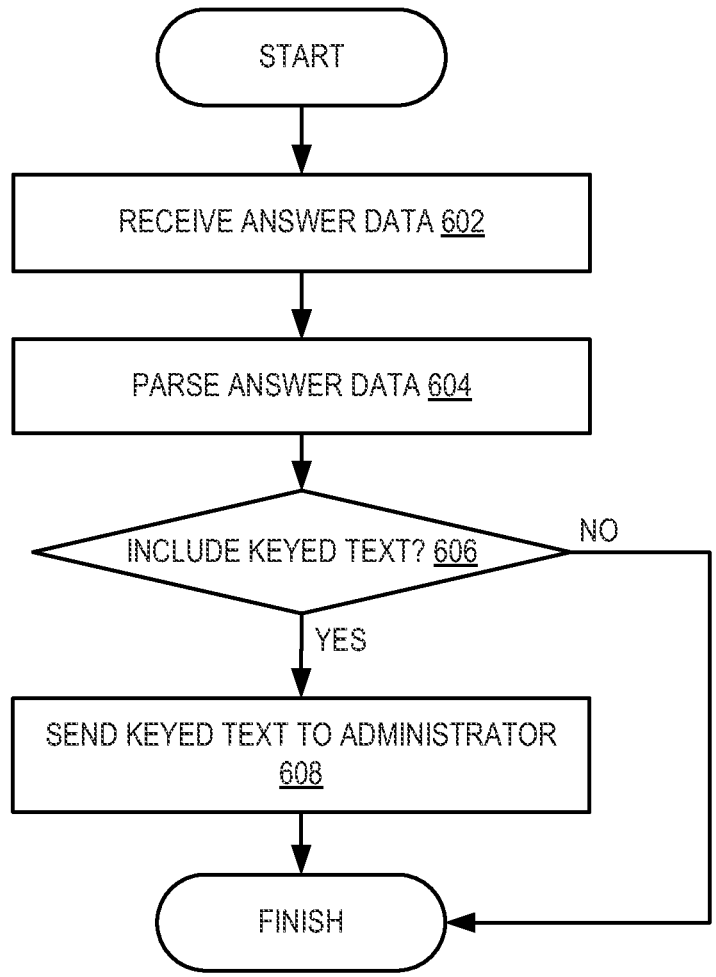
FIG. 6 is a flow diagram illustrating a method for providing feedback data to an administrator according to one embodiment.

Referring now to FIGS. 4-6, various embodiments of the method in the specification are described. FIG. 4 is a flow diagram illustrating a method 400 for determining a claim precision for a review set according to one embodiment. The communication module 201 retrieves 405 claim data from the claim database 128 and sends the claim data to the selection module 203. The selection module 203 determines 410 a review set including one or more claims from the claim data. The selection module 203 sends the review set to the query module 205.

The query module 205 determines 415 an evaluation form for each claim included in the review set. In one embodiment, the query module 205 sends an identifier of the evaluation form to the GUI module 126, causing the GUI module 126 to retrieve graphical form data from the graphical database 194. The GUI module 126 generates graphical data for providing a GUI depicting the evaluation form based at in least in part on the graphical form data. The GUI module 126 sends 420 the graphical data for providing the GUI to one or more evaluation clients 239, causing the one or more evaluation clients 239 to present the GUI depicting the evaluation form to one or more evaluators 241.

The communication module 201 receives 425 one or more sets of answer data from the one or more evaluators 241 and sends the one or more sets of answer data to the query module 205. In one embodiment, the query module 205 stores the one or more sets of answer data in the evaluation database 196. In another embodiment, the query module 205 sends the one or more sets of answer data to the determination module 207. The determination module 207 determines 430 a validity decision for the claim based at least in part on the one or more sets of answer data.

Steps 415-430 are performed to each claim included in the review set respectively so that one or more validity decisions are generated for the one or more claims included in the review set. The determination module 207 determines 435 a claim precision for the review set based at least in part on the one or more validity decisions for the one or more claims.

FIGS. 5A and 5B are flow diagrams illustrating a method 500 for determining a claim precision for a review set according to another embodiment. Referring to FIG. 5A, the claim module 199 receives 502 claim data from one or more users via the front end interface 102 and stores 504 the claim data in the claim database 128. The communication module 201 retrieves 506 the claim data from the claim database 128 and sends the claim data to the selection module 203. The selection module 203 determines 508 a review set including one or more claims from the claim data. The selection module 203 sends the review set to the query module 205.

Referring to FIG. 5B, the query module 205 selects a claim from the review set for which a validity decision is not determined yet and determines 510 a content type of an asset associated with the claim. The query module 205 determines 512 an evaluation form for the claim based at least in part on the content type of the asset. For example, the query module 205 determines an evaluation form that is customized for an audio asset if the content type of the asset is an audio file. In one embodiment, the query module 205 sends an identifier of the evaluation form to the GUI module 126, causing the GUI module 126 to retrieve 514 graphical form data describing the evaluation form from the graphical database 194.

The GUI module 126 generates graphical data for providing a GUI depicting the evaluation form based at in least in part on the graphical form data. The GUI module 126 sends 516 the graphical data for providing the GUI that depicts the evaluation form to one or more evaluation clients 239, causing the one or more evaluation clients 239 to present the evaluation form to one or more evaluators 241 respectively. The communication module 201 receives 518 one or more sets of answer data from the one or more evaluators 241 and sends the one or more sets of answer data to the query module 205. In one embodiment, the query module 205 stores the one or more sets of answer data in the evaluation database 196. In another embodiment, the query module 205 sends the one or more sets of answer data to the determination module 207. The determination module 207 determines 520 a validity decision for the claim based at least in part on the one or more sets of answer data.

The determination module 207 determines 522 whether the review set includes any additional claim for which a validity decision is not determined yet. If there is at least one claim for which a validity decision is not determined yet, the method 500 moves to step 510. Otherwise, the method moves to step 524. Turning to step 524, the determination module 207 determines a claim precision for the review set based at least in part on one or more validity decisions for the one or more claims.

FIG. 6 is a flow diagram illustrating a method 600 for providing feedback data to an administrator of the system 130 according to one embodiment. The communication module 201 receives 602 answer data from an evaluator 241 and sends the answer data to the feedback module 209. The feedback module 209 parses 604 the answer data and determines 606 whether the answer data includes keyed text. If the answer data includes keyed text, the method moves to step 608. Otherwise, the method 600 ends. Turning to step 608, the feedback module 209 sends the keyed text to the administrator as feedback data. In one embodiment, the feedback module 209 updates an evaluation form based at least in part on the feedback data.

Graphical Representation

FIG. 7A is a graphical representation illustrating a GUI for providing an evaluation form 700 according to one embodiment. The evaluation form 700 includes a first audio clip 702, a second audio clip 704, one or more queries 706 for categorizing an association between the first audio clip 702 and the second audio clip 704, a field 708 and a field 710 for inputting keyed text. In one embodiment, the first audio clip 702 is an asset and the second audio clip 704 is a reference file. In another embodiment, the first audio clip 702 is a reference file and the second audio clip 704 is an asset. An evaluator 241 provides one or more answers to the one or more queries 706 and sends the one or more answers to the determination module 207 by clicking a "submit selection" button 712.

FIG. 7B is a graphical representation illustrating a GUI for providing an evaluation form 750 according to another embodiment. The evaluation form 750 includes a first video clip 752, a second video clip 754, one or more queries 756 for categorizing an association between the first video clip 752 and the second video clip 754 and a field 758 for inputting keyed text (e.g., one or more comments). In one embodiment, the first video clip 752 is an asset and the second video clip 754 is a reference file. In another embodiment, the first video clip 752 is a reference file and the second video clip 754 is an asset. An evaluator 241 provides one or more answers to the one or more queries 756 and sends the one or more answers to the determination module 207 by clicking a "submit" button 760.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   determining a review set including one or more claims, each claim indicating an association between a respective asset media file and a respective reference media file, the review set determined based at least in part on claim data describing the one or more claims, the association between the respective asset media file and the respective reference media file indicating a similarity between the respective asset media file and the respective reference media file;
   determining, based at least in part on the review set, an evaluation form including one or more queries associated with a first claim of the one or more claims, the first claim indicating a first association between a first asset media file and a first reference media file, the queries to determine whether the first association is accurate based on a comparison between media contents of the first asset media file and the first reference media file;

receiving answer data describing one or more answers responsive to the one or more queries included in the evaluation form; and determining, by a processor, a validity decision associated with the first claim based at least in part on the answer data, the validity decision indicating whether the first association is accurate, the first association indicating a similarity between the first asset media file and the first reference media file.

2. The method of claim 1, further comprising:

determining a claim precision for the review set based at least in part on one or more validity decisions for the one or more claims of the review set.

3. The method of claim 2, wherein the claim precision includes data describing a percentage of incorrect claims in the review set.

4. The method of claim 1, wherein determining the evaluation form further comprises:

determining a content type of the first asset media file associated with the first claim; and determining the evaluation form based at least in part on the content type.

5. The method of claim 1, wherein determining the validity decision of the first claim further comprises:

determining a second association between the first asset media file associated with the first claim and the first reference media file associated with the first claim based at least in part on the answer data;

determining whether the second association is matched to the first association provided by the first claim; and responsive to a determination that the second association is matched to the first association, determining that the first claim is correct.

6. The method of claim 1, further comprising:

retrieving graphical form data associated with the evaluation form; and generating graphical data for presenting the evaluation form to a user based at least in part on the graphical form data.

7. The method of claim 1, further comprising:

determining whether the answer data includes keyed text data; and responsive to a determination that the answer data includes the keyed text data, providing the keyed text data to an administrator.

8. A system, comprising:

a memory; and a processor, coupled to the memory to:

determine a review set including one or more claims, each claim indicating an association between a respective asset media file and a respective reference media file, the review set determined based at least in part on claim data describing the one or more claims, the association between the respective asset media file and the respective reference media file indicating a similarity between the respective asset media file and the respective reference media file;

determine, based at least in part on the review set, an evaluation form including one or more queries associated with a first claim of the one or more claims, the first claim indicating a first association between a first asset media file and a first reference media file, the queries to determine whether the first association is accurate based on a comparison between media contents of the first asset media file and the first reference media file;

receive answer data describing one or more answers responsive to the one or more queries included in the evaluation form; and determine a validity decision associated with the first claim based at least in part on the answer data, the validity decision indicating whether the first association is accurate, the first association indicating a similarity between the first asset media file and the first reference media file.

9. The system of claim 8, the processor further to:

determine a claim precision for the review set based at least in part on one or more validity decisions for the one or more claims of the review set.

10. The system of claim 9, wherein the claim precision includes data describing a percentage of incorrect claims in the review set.

11. The system of claim 8, the processor further to:

determine a content type of the first asset media file associated with the first claim; and determine the evaluation form based at least in part on the content type.

12. The system of claim 8, the processor further to:

determine a second association between the first asset media file associated with the first claim and the first reference media file associated with the first claim based at least in part on the answer data;

determine whether the second association is matched to the first association provided by the first claim; and responsive to a determination that the second association is matched to the first association, determine that the first claim is correct.

13. The system of claim 8, further comprising:

a graphical user interface module communicatively coupled to the query module and the communication module, the graphical user interface module generating graphical data for presenting the evaluation form to a user based at least in part on graphical form data associated with the evaluation form; and wherein the communication module retrieves the graphical form data associated with the evaluation form and sends the graphical form data to the graphical user interface module.

14. The system of claim 8, the processor further to:

determine whether the answer data includes keyed text data, the feedback module providing the keyed text data to an administrator responsive to a determination that the answer data includes the keyed text data.

15. A non-transitory computer-readable storage medium comprising executable instructions that, when executed by a computing device, cause the computing device to:

determine a review set including one or more claims, each claim indicating an association between a respective asset media file and a respective reference media file, the review set determined based at least in part on claim data describing the one or more claims, the association between the respective asset media file and the respective reference media file indicating a similarity between the respective asset media file and the respective reference media file;

determine, based at least in part on the review set, an evaluation form including one or more queries associated with a first claim of the one or more claims, the first claim indicating a first association between a first asset media file and a first reference media file, the queries to determine whether the first association is accurate based on a comparison between media contents of the first asset media file and the first reference media file;

receive answer data describing one or more answers responsive to the one or more queries included in the evaluation form; and determine a validity decision associated with the first claim based at least in part on the answer data, the validity decision indicating whether the first association is accurate, the first association indicating a similarity between the first asset media file and the first reference media file.

16. The non-transitory computer-readable storage medium of claim 15, the executable instructions further to:
determine a claim precision for the review set based at least in part on one or more validity decisions for the one or more claims of the review set.

17. The non-transitory computer-readable storage medium of claim 16, wherein the claim precision includes data describing a percentage of incorrect claims in the review set.

18. The non-transitory computer-readable storage medium of claim 15, wherein determining the evaluation form further comprises:

determining a content type of the first asset media file associated with the first claim; and determining the evaluation form based at least in part on the content type.

19. The non-transitory computer-readable storage medium of claim 15, wherein determining the validity decision of the first claim further comprises:

determining a second association between the first asset media file associated with the first claim and the first reference media file associated with the first claim based at least in part on the answer data;

determining whether the second association is matched to the first association provided by the first claim; and responsive to a determination that the second association is matched to the first association, determining that the first claim is correct.

20. The non-transitory computer-readable storage medium of claim 15, wherein the instructions cause the computing device to perform operations further comprising:

determining whether the answer data includes keyed text data; and responsive to a determination that the answer data includes the keyed text data, providing the keyed text data to an administrator.

* * * * *